(12) United States Patent
Bambagioni et al.

(10) Patent No.: US 11,738,527 B2
(45) Date of Patent: Aug. 29, 2023

(54) METHOD AND DEVICE FOR APPLYING A SEALING MEMBER ONTO A BEVERAGE CAPSULE

(71) Applicant: SOCIETE DES PRODUITS NESTLE S.A., Vevey (CH)

(72) Inventors: Guido Bambagioni, Perugia (IT); Veith Behrmann, Villeneuve (CH)

(73) Assignee: Societe des Produits Nestle S.A., Vevey (CH)

( * ) Notice: Subject to any disclaimer, the term of this patent is extended or adjusted under 35 U.S.C. 154(b) by 16 days.

(21) Appl. No.: 16/757,862

(22) PCT Filed: Oct. 19, 2018

(86) PCT No.: PCT/EP2018/078680
§ 371 (c)(1),
(2) Date: Apr. 21, 2020

(87) PCT Pub. No.: WO2019/081363
PCT Pub. Date: May 2, 2019

(65) Prior Publication Data
US 2021/0187881 A1 Jun. 24, 2021

(30) Foreign Application Priority Data
Oct. 24, 2017 (EP) .................. 17198091

(51) Int. Cl.
*B29C 70/80* (2006.01)
*A47J 31/40* (2006.01)
(Continued)

(52) U.S. Cl.
CPC ............ *B29C 70/80* (2013.01); *A47J 31/407* (2013.01); *B65D 85/8043* (2013.01); *B29L 2031/565* (2013.01); *B29L 2031/7174* (2013.01)

(58) Field of Classification Search
CPC . B29C 70/80; B29C 43/183; B29C 2043/022; B29C 2043/023; B29C 43/027; B29C 2043/026
See application file for complete search history.

(56) References Cited

U.S. PATENT DOCUMENTS 1,447,816 A * 3/1923 Peelle ................. B21D 51/46
264/268
1,451,470 A * 4/1923 Peelle ................. B29C 70/80
425/94
(Continued)

FOREIGN PATENT DOCUMENTS

EP 2151313 2/2010
JP 2010155118 A 7/2010
(Continued)

OTHER PUBLICATIONS

Japanese Office Action for Japanese Appl No. 2020-519992 dated Dec. 6, 2022.

*Primary Examiner* — Matthew J Daniels
(74) *Attorney, Agent, or Firm* — K&L Gates LLP

(57) ABSTRACT

The invention relates to a method for applying a sealing member onto the cup-shaped container of a capsule intended for producing a beverage in a beverage production device, wherein the container has a bottom wall, a side wall with an outer surface, an open end and an annular flange which extends from the side wall of the container at the open end; the flange comprising a flange outer surface merging with the outer surface of the side wall at a transition area an flange inner surface opposite to the outer surface for being sealed with a beverage delivery wall, the method comprising the steps of: depositing molten thermoplastic polymer material by a depositing apparatus onto the outer surface of the annular flange and/or onto the transition area, subsequently pressing the thermoplastic polymer material by a punch-die (Continued)

while the material still being plastically deformable so as to conform it in its final shape onto the outer surface of the annular flange and/or onto the transition area thereby forming it into an annular sealing member attached to the container.

18 Claims, 6 Drawing Sheets

(51) Int. Cl.
*B65D 85/804* (2006.01)
*B29L 31/56* (2006.01)
*B29L 31/00* (2006.01)

(56) References Cited

U.S. PATENT DOCUMENTS

| | | | | |
|---|---|---|---|---|
| 1,528,263 | A * | 3/1925 | Peelle | B29C 48/0022 |
| | | | | 264/130 |
| 1,868,990 | A * | 7/1932 | Peelle | B67B 3/064 |
| | | | | 425/378.1 |
| 2,272,920 | A * | 2/1942 | Merta | B29C 51/26 |
| | | | | 493/107 |
| 4,181,313 | A * | 1/1980 | Hillier | F16J 15/104 |
| | | | | 277/638 |
| 5,599,563 | A * | 2/1997 | Yocum | B29C 44/04 |
| | | | | 425/117 |
| 5,686,040 | A | 11/1997 | Taber | |
| 8,176,714 | B2 | 5/2012 | Abegglen et al. | |
| 9,162,815 | B2 * | 10/2015 | Yoakim | B65D 85/8046 |
| 2009/0017177 | A1 | 1/2009 | Yoakim | |
| 2011/0210478 | A1 | 9/2011 | Nordlund et al. | |
| 2016/0251149 | A1 | 9/2016 | Gerbauiet et al. | |
| 2016/0318212 | A1 | 11/2016 | Albonetti et al. | |
| 2018/0362198 | A1 * | 12/2018 | Volpe | B65B 29/022 |

FOREIGN PATENT DOCUMENTS

| | | | | |
|---|---|---|---|---|
| JP | | 2011528288 A | 11/2011 | |
| JP | | 2013503054 A | 1/2013 | |
| WO | WO-2015092644 A1 * | | 6/2015 | B29C 31/041 |
| WO | WO-2018215982 A2 * | | 11/2018 | B29C 43/08 |

\* cited by examiner

METHOD AND DEVICE FOR APPLYING A SEALING MEMBER ONTO A BEVERAGE CAPSULE

CROSS REFERENCE TO RELATED APPLICATIONS

The present application is a National Stage of International Application No. PCT/EP2018/078680, filed on Oct. 19, 2018, which claims priority to European Patent Application No. 17198091.5, filed on Oct. 24, 2017, the entire contents of which are being incorporated herein by reference.

FIELD OF THE INVENTION

The present invention generally relates to the field of manufacturing beverage capsules containing beverage ingredients for the preparation of beverages such a coffee. More particularly, the invention relates to a method and a device for applying a sealing member onto a beverage capsule.

BACKGROUND

Certain beverage preparation machines, such as coffee machines, are designed for receiving beverage capsules with their own sealing member. The sealing member is arranged for precisely matching with a capsule cage of the machine to ensure a pressure-resistant water-tight engagement during brewing. The sealing member avoids the risk of water by-passing the capsule and ensures the control of the pressure in the ingredients' chamber of the capsule and so guarantees the performance of coffee extraction. Typically, the capsule comprises a cup-shaped container with a bottom wall, a side wall with an outer surface, an open end and an annular flange which extends from the side wall of the container at the open end. The flange comprises a flange outer surface merging with the outer surface of the side wall at a transition area, a flange inner surface opposite to the inner surface for being sealed with a beverage delivery wall, such as an aluminium foil intended to be torn under pressure in the machine.

As it is described in EP1654966, a sealing member is applied onto the flange of the capsule, in particular on the outer surface of the flange and the transition area with the side wall. The sealing member can be integral to the capsule or a separate piece. In the latter case the sealing member can be mounted releasably to the base container or fixed thereto by welding or by means of an adhesive or applied in fluid or viscous form and then hardened (e.g. polymerized) once applied onto the outer surface of the capsule, which is the case when applying silicone.

EP2012994 relates to a method for producing a capsule containing beverage ingredients by injection-moulding. This process is relatively complex and costly to implement. Furthermore, it is not well suited to optimize the amount of sealing material on the capsule.

EP2151313 describes a method for providing a rubber-elastic sealing member onto a rigid capsule's container comprising the steps of applying an uncured sealing composition in a liquid or viscous state onto the rim portion, heating the sealing composition such that the sealing composition at least partially migrates towards the side wall until it reaches the side wall, and curing the sealing composition after the migration towards the side wall.

However, this method is relatively complex, time consuming and costly to carry out because it requires a heating operation in an oven during several minutes and curing thereafter. Furthermore, the shape, dimensions and application area of the sealing member cannot be fully controlled as it depends on parameters such as viscosity and surface tension of the sealing material.

Therefore, the invention aims at proposing a solution to improve the application of a sealing member onto a beverage capsule, improving in particular the control of the arrangement of sealing member onto the capsule such as its shape, position, size and/or amount applied material. It also aims at providing a simpler and speedier application process.

The object is achieved by means of the features of the independent claims. The dependent claims develop further the present invention and may provide additional advantages to the central idea.

SUMMARY OF THE INVENTION

In one aspect, the invention relates to a method for applying a sealing member onto the cup-shaped container of a capsule intended for producing a beverage in a beverage production device, wherein the container has a bottom wall, a side wall with an outer surface, an open end and an annular flange which extends from the side wall of the container at the open end; the flange comprising a flange outer surface merging with the outer surface of the side wall at a transition area and a flange inner surface opposite to the outer surface for being sealed with a beverage delivery wall, the method comprising the steps of:
 depositing molten thermoplastic polymer material by a depositing apparatus onto the outer surface of the annular flange and/or onto the transition area,
 subsequently pressing by a punch-die the thermoplastic polymer material while the material still being plastically deformable so as to conform it, preferably into its final shape, onto the outer surface of the annular flange and/or onto the transition area thereby forming it into an annular sealing member attached to the container.

Therefore, contrary to the prior sealing member application processes, the final configuration of the sealing member is better controlled while the process remains simple. In particular, very small amounts of sealing material can be handled and successfully conformed into a sealing member for the capsule.

The pressing step may comprise pressing the thermoplastic polymer material into its final shape by pressing a circumferential punch-die comprising a continuous annular pressing surface against the mass of thermoplastic polymer material. The punch-die may have a flat, slanted or convex pressing surface contacting the thermoplastic material. The form of the pressing surface can be adapted to the geometry of the container of the capsule and to the desired forming result. The final shape, thickness, the surface structuring and/or the covered surface area by the sealing member on the surface of the container can be more accurately controlled.

In one mode, the depositing step comprises depositing the molten thermoplastic polymer material into a single circumferential open or closed portion of molten material. The pressing step by the punch-die then ensures the dimensioning consistency and the continuity of the sealing member along the circumference of the flange when the portion is open.

In a second mode, the depositing step comprises depositing the molten thermoplastic polymer material into a circumferential arrangement of two or a plurality of separate portions. In this mode, the pressing step by the punch-die preferably ensures the dimensioning consistency and the continuity of the sealing member along the circumference of the flange by spreading the material of the portions to become circumferentially joined on the flange.

In an aspect, the depositing step comprises depositing the molten thermoplastic polymer material by a depositing apparatus including any one of:
- a circumferential dispensing nozzle sized to the circumference of the flange,
- a moving nozzle displaced along the circumference of the flange,
- a plurality of nozzles disposed along the circumference of the flange.

Thus, different kinds of nozzles can be used to carry out the method of the invention and the kind of nozzle may not necessarily be a critical factor to achieve satisfying depositing results.

In a preferred mode, the depositing step comprises depositing the molten thermoplastic polymer material by a depositing apparatus comprising a circumferential dispensing nozzle and a central recess arranged for accommodating at least partially the container of the capsule.

The advantage essentially lies in the reduction of the number of parts, a simpler and accurate depositing on a preformed cup-shaped container and the facilitating of the subsequent continuity pressing of the sealing member. In particular, the flow control is easier and it is not necessary to control the flow rate in function of a rotation speed (e.g. of capsule or nozzle) during depositing since the two are stationary when depositing.

The deposited amount of molten thermoplastic polymer material may be controlled differently depending on the configuration of the nozzle. In particular, the deposited amount of material may be controlled at least partially by the opening time of an outlet nozzle. Alternatively, the deposited amount of material may be controlled by the pressure time applied to a one-way dosing valve of the nozzle.

According to the invention, the thermoplastic polymer material is preferably thermoplastic elastomer ("TPE") or other soft thermoplastic polymers (e.g. soft polypropylene).

The thermoplastic elastomer may be selected amongst the group consisting of:
- Styrenics (S-TPE's or TPE-S's or TPS's; important examples of TPS's are SBS and SEBS),
- Copolyesters (COPE's or TPE-E's or TPC's),
- Copolyamides (COPA's),
- Polyurethanes (TPU's or TPE-U's),
- Polyamides (PEBA's or TPE-A's or TPA's),
- Polyolefin Blends (TPO's or TPE-O's),
- Polyolefin Alloys (TPV's or TPE-V's),
- Reactor TPO's (R-TPO's),
- Polyolefin Plastomers (POP's),
- Polyolefin Elastomers (POE's) and combinations thereof.

The polymer material in general can be foamed or non-foamed after solidifying and becoming the sealing member on the container. The material is generally chosen to be softer at ambient temperature (20° C.) than the material of the container. The material of the capsule's container is generally an aluminium alloy or food grade thermoplastic polymer(s) or a combination of both. In the case of the capsule being made of thermoplastic polymer, the polymer of the capsule container is harder than the polymer of the sealing member.

The melting temperature depends on the thermoplastic polymer material and pressure in the depositing apparatus but may generally vary from 150° C. to 260° C., more preferably from 170° C. to 245° C.

The invention also relates to a device for applying a sealing member onto the cup-shaped container of a capsule intended for producing a beverage in a beverage production device, wherein the container has a bottom wall, a side wall with an outer surface, an open end and an annular flange which extends from the side wall of the container at the open end; the flange comprising a flange outer surface merging with the outer surface of the side wall at an transition area and a flange inner surface opposite to the outer surface for being sealed with a beverage delivery wall; the device comprising:
- a depositing apparatus for depositing molten thermoplastic polymer material onto the outer surface of the annular flange and/or onto the transition area and,
- a pressing apparatus for pressing the molten thermoplastic polymer material so as to conform it, preferably into its final shape, onto the outer surface of the annular flange and/or onto the transition area thereby forming it into an annular sealing member attached to the container.

Preferably, the pressing apparatus comprises a circumferential punch-die comprising a continuous annular pressing surface for pressing against the mass of thermoplastic material. The pressing surface have preferably a generally flat, slanted, convex or concave shape. A generally convex pressing surface presents the advantage of providing a sealing member that compensates well to the surface or geometrical irregularities of the closing surfaces of the capsule cage of the beverage machine. A generally concave or flat pressing surface enables to produce circumferential sealing ridge(s) that can accurately adapt to the closing surface of the capsule cage. A generally slanted surface may conform the material towards the transition area of the container of the capsule (as for the capsule described in EP2151313) where presence of sealing material can be the most effective for the sealing function. In addition to the general shape, the pressing surface may comprise a smaller structure such as ridges and/or slits and/or drops. The ridges and/or slits and/or drops can be oriented circumferentially, radially or in other directions. This may further improve the sealing performance of the sealing member.

Preferably, the pressing apparatus is cooled down by cooling means. The cooling means can comprise a cooling fluid jacket embedded or associated to the pressing apparatus. The advantage is to increase the production rate by solidifying the sealing member sooner and facilitating the capsule handling as well as reducing risk of dust contamination of the sealing member.

The depositing apparatus comprises a circumferential dispensing nozzle and a central recess for accommodating at least partially the container of the capsule. The apparatus is simpler and provides accurate depositing of small quantities of polymer material (e.g. smaller than 100 mg) and facilitates the subsequent continuity pressing of the sealing member.

The circumferential dispensing nozzle is arranged with an annular dosing outlet or a plurality of annular or cylindrical dispensing outlets circumferentially arranged along a circle having a diameter substantially equal or slightly larger than the diameter of the transition area of the container of the capsule.

In particular, the depositing apparatus may comprise an inner part, an outer part and a dispensing passage in-between. The two parts being coaxial and the inner part and outer part being arranged for axially moving relative to each other between a closed position and an open depositing position.

The inner part may be the reciprocally moving part and the outer part be the stationary part to open and close at least one dispensing outlet. Reversely, the outer part may be the reciprocally moving part and the inner part the stationary part to open and close at least one dispensing outlet. The inner part and outer part may also be both reciprocally moving to open and close at least one dispensing outlet.

The depositing apparatus may further comprises heating means in the inner part and/or outer part. The heating means may comprise at least one electrical resistance or a heated fluid channel.

DESCRIPTION OF PARTICULAR ASPECTS AND EMBODIMENTS OF THE INVENTION

To start with, an example of the method and apparatus of the invention can be described in relation to FIGS. 1 to 9.

Figure 1:
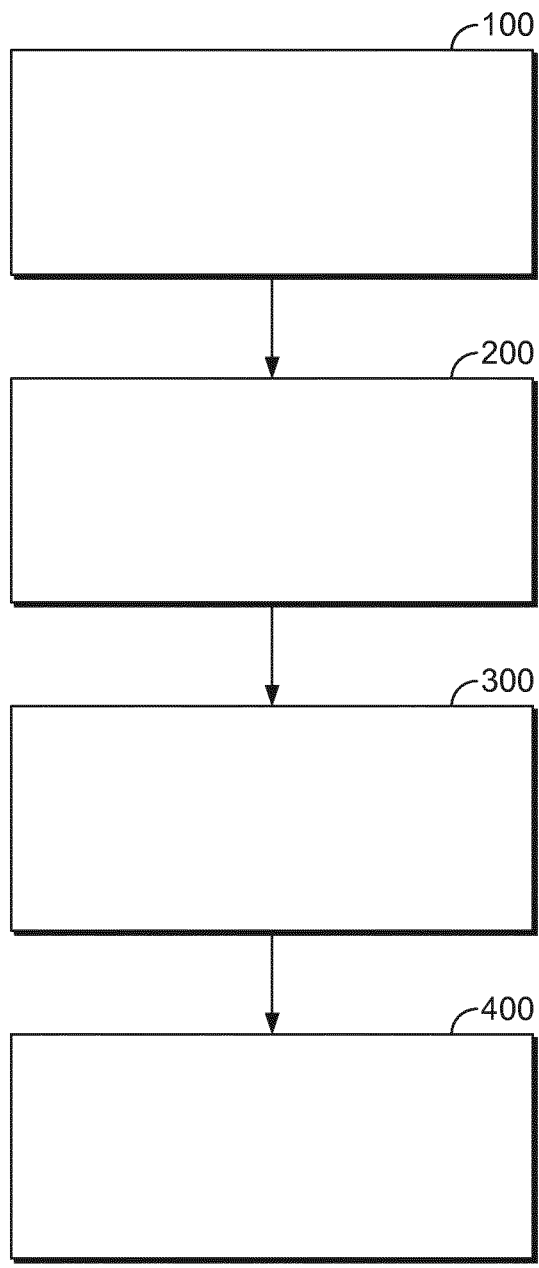
FIG. 1 is flow chart of a possible method of the invention.

The application method of the invention comprises applying a sealing member 2 onto a cup-shaped container 1 of a beverage capsule. As shown by FIG. 1, the method generally comprises a step 100 of melting thermoplastic material 3, a step 200 of depositing the molten material on the cup-shaped container 1, a step 300 of plastically deforming the deposited thermoplastic material and optionally a step 400 of cooling the formed thermoplastic material to produce a hardened sealing member. A subsequent forming after cooling is not preferred but not fully excluded either.

Generally (FIG. 3), the cup-shaped container 1 has a bottom wall 6, a side wall 7 with an outer surface 8, an open end 9 and an annular flange 10 which extends from the side wall of the container at the open end. The annular flange 10 comprises a flange outer surface 11 merging with the outer surface 8 of the side wall at a transition area 12. The flange further comprises a flange inner surface 13 opposite to the outer surface 11 for being sealed (after filling of the container with beverage ingredients) with a beverage delivery wall.

Figure 2:
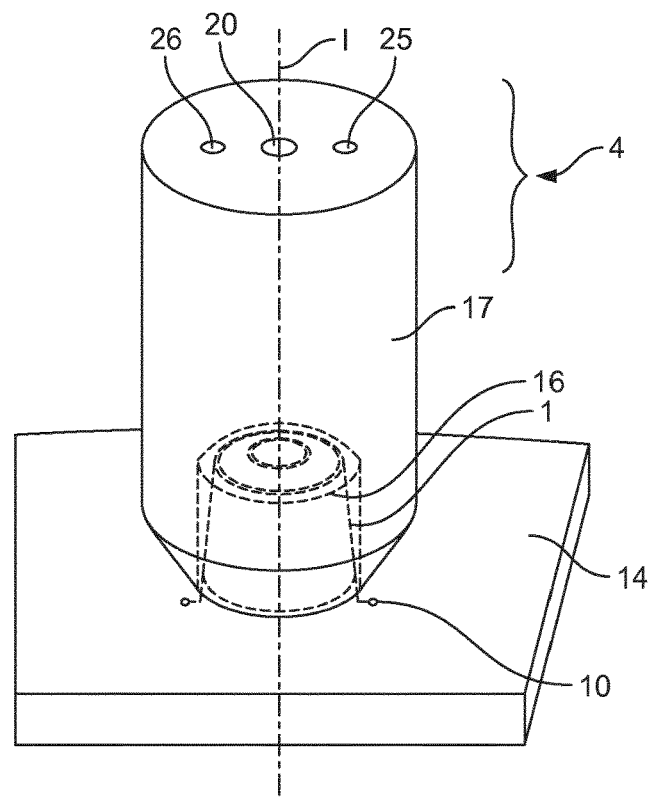
FIG. 2 is a schematic representation in perspective of a depositing apparatus.
Figure 3:
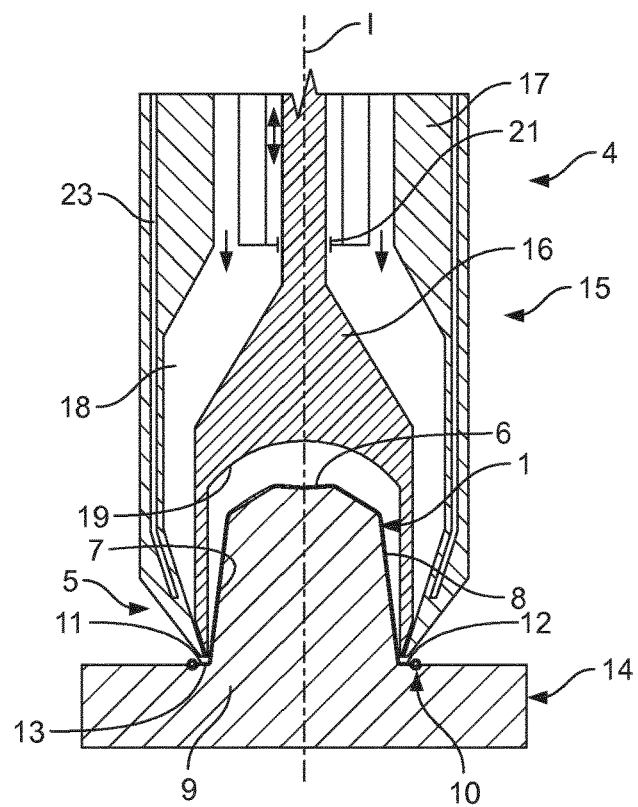
FIG. 3 is a schematic cross-sectional representation of a depositing apparatus and depositing step before depositing.

In the mode of FIGS. 2 and 3, the depositing apparatus 4 is illustrated with a circumferential depositing nozzle 5 which can open to dispense the molten material and close to stop dispensing it, but other variations are possible such as a moving nozzle which is displaced when depositing along the circumference of the annular flange or a plurality of independent depositing nozzles distributed at the circumference of the flange 10 of the capsule.

The depositing apparatus 4 comprises a support subassembly 14 configured for receiving the container of the capsule in a defined position especially with a form that fits in the cavity of the container through the open end. The apparatus may comprise a depositing subassembly 15 comprising a depositing nozzle 5. The depositing subassembly can comprise an inner part 16 and an outer part 17 which are coaxial and define together a molten material flow passage 18 communicating with the circumferential nozzle 5. The two parts are axially moveable relative to each other (along axis I also representing the container longitudinal axis) to ensure opening of the nozzle for depositing and closing it for stopping the deposition.

In this example, the inner part is axially reciprocating between the open and closed position of the depositing nozzle. The outer part remains stationary. The inner part can be mounted with a central axle 20 axially moving in a bore 21 of the outer part.

The inner part preferably comprise a central recess 19 which is arranged for accommodating the container of the capsule such that the depositing nozzle can come as close as possible to the depositing area of the container. The position of the nozzle relative to the flange and the geometry of the recess may be adapted as a function of the desired final position and/or shape of the sealing member.

The molten thermoplastic material can be kept in the depositing apparatus in molten state by heating means. The heating means may be located in the outer part and/or inner part. In the example, the heating means can be at least one electrical resistance and/or at least one heated fluid conduit 23 embedded in the outer part.

The molten material can be kept pressurized in the depositing apparatus such as by means of a mechanical and/or hydraulic pressure device. The pressure device can also be external to the apparatus such as arranged in a remote melting reservoir of molten material. It can be, for instance, a piston or screw device arranged to supply molten material to the flow passage 18 such as via conduits 25, 26. Melting of the material can also be initiated remotely and supplied to the depositing apparatus through the flow passage 18. Polymer material may be fed in a melting reservoir or apparatus in the form of powder or pellets.

Figure 4:
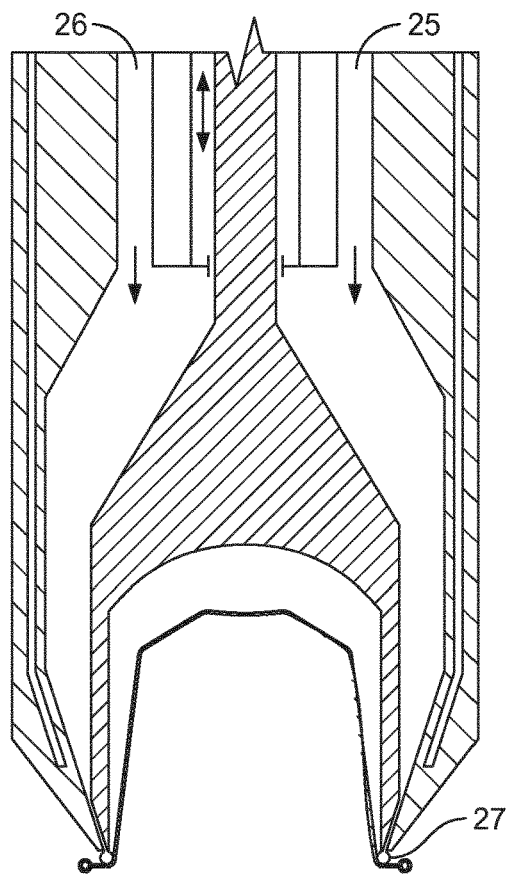
FIG. 4 is a schematic cross-sectional representation of a depositing apparatus and depositing step during depositing.
Figure 5:
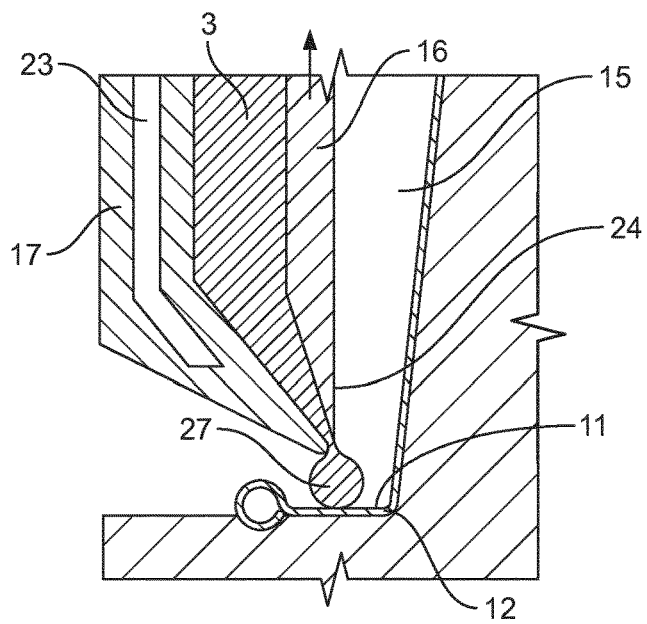
FIG. 5 is an enlarged view of the depositing apparatus with the nozzle opened when depositing molten thermoplastic material on the container of the capsule.

FIGS. 4 and 5 illustrate the depositing operation. As the inner part 16 is retracted, a circumferential depositing outlet 24 is opened allowing the molten material to flow off the nozzle and deposit on the outer surface 11 of the flange. For example, an annular cord 27 of molten material is produced and deposited on the surface until the nozzle closes off by the inner part returning to the initial position in sealed contact with the outer part.

The flow of material is controlled by the opening of the outlet (size and opening time). Such control enables to deposit an amount of molten material as small as a few tens of milligrams. Typically, the opening time is a matter of milliseconds and the width of the outlet is a matter of few tenths of a millimeter.

The depositing area on the container can be varied by varying the diameter of the inner part 16 or recess 19 and the depositing of material can take place at the transition area 12 of the flange and side wall of the capsule's container for instance.

Figure 6:
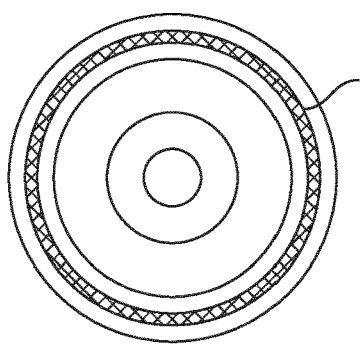
FIG. 6 is a top view of a container of capsule with a continuous depositing of molten thermoplastic material before forming of the sealing member.

FIG. 6 shows a continuous deposited mass 27 of thermoplastic material after depositing and before forming. The mass is deposited with a depositing nozzle forming an annular outlet 24 which is, in opened position, continuously open and delimited by the inner and outer parts along the full circumference of the nozzle.

Figure 7:
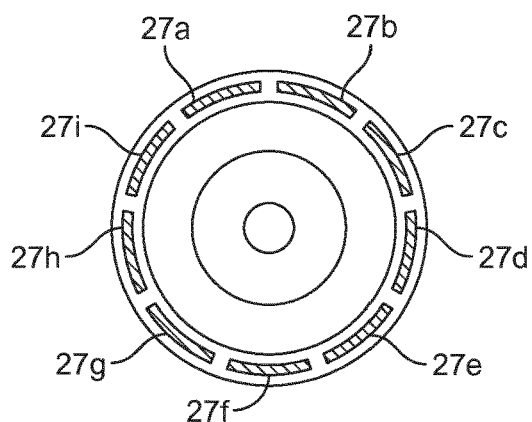
FIG. 7 is a top view of a container of capsule with a discontinuous depositing of molten thermoplastic material before forming of the sealing member.

FIG. 7 shows the mass formed by a circumferential arrangement of a plurality of deposited portions 27*a-i* of sealing polymer material before forming. The portions can be arc-shaped or a plurality of tiny dots of polymer spaced by a short distance. The portions are deposited with a depositing nozzle forming a plurality of annular outlets which are delimited by the inner and outer parts. For instance, outlet separations can be obtained by a particular structure in relief and/or recess of the nozzle formed by the inner and/or outer parts 16, 17.

Figure 8:
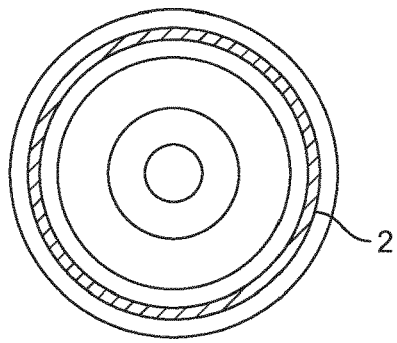
FIG. 8 is a top view of a container of capsule with the sealing member after forming.

FIG. 8 shows the sealing member 2 applied on the container of the capsule after forming. The forming may spread the portions 27*a-i* to such an extent that the neighbouring portions meet or overlap in the circumferential direction of the flange to provide a final continuous form of sealing member.

Figure 9:
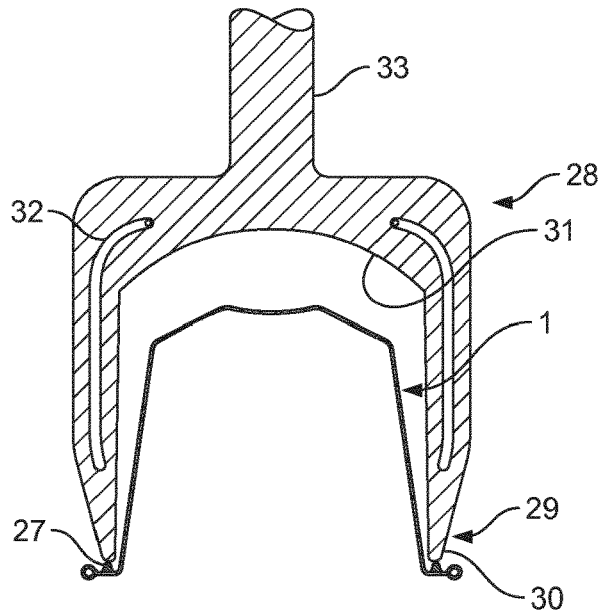
FIG. 9 is a schematic cross-sectional view of the punch-die apparatus.

The forming operation may be carried out by a pressing apparatus 28 as illustrated in FIG. 9. The pressing apparatus may comprise a punch-die 29 having a continuous annular pressing surface 30 arranged for facing the deposited polymer mass 27. The pressing apparatus is also configured as an inverted cup with a central recess 31 to allow the cup-shaped body 1 of the container to be accommodated without pressure or deformation. As a result, the pressure applied by the punch-die is only focused on the thermoplastic material to be shaped into a final shape or at least semi-final shape of the sealing member. Pressing is applied while the thermoplastic polymer is still hot and plastically deformable without making crevasses or cracks, for example above or at its glass transition temperature. The apparatus may comprise a rod 33 connected to or part of a hydraulic or electrical ram (not represented) for instance. Cooling means may be embedded or associated to the pressing apparatus. For example, a fluid cooling circuit 32 can be managed within the punch-die.

FIGS. 10 to 20 illustrates various arrangements of the forming surface 30 of the punch-die of the pressing device for shaping the thermoplastic material into a sealing member. The forming surfaces may be arranged to deform, dimension and/or displace the material such that an optimal configuration of the sealing member is obtained as a result of the forming operation.

Figure 10:
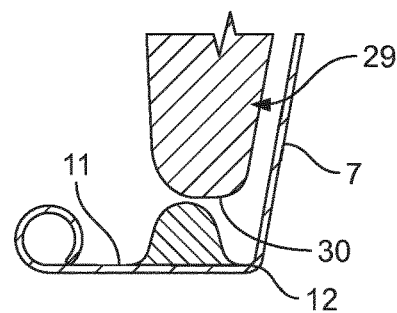
FIGS. 10 and 11 are schematic representations of the forming step with a convex punch-die.
Figure 11:
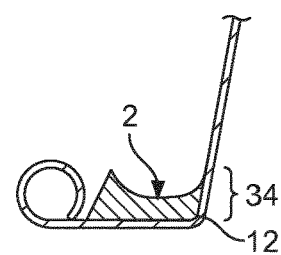

In the example of FIGS. 10 and 11, the forming surface 30 is generally convex so as to provide a sealing member with a concave sealing surface. Part of the sealing material can be moved to the transition area 12 of the container with some material covering an annular portion 34 of the side wall.

Figure 12:
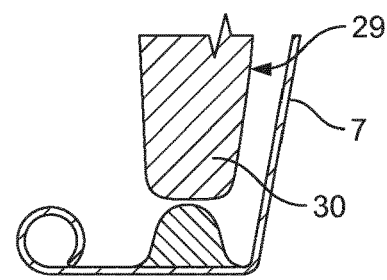
FIGS. 12 and 13 are schematic representations of the forming step with a flat punch-die.
Figure 13:
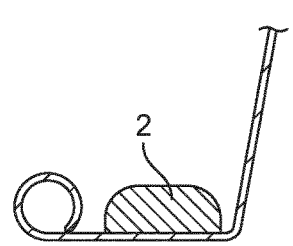

In the example of FIGS. 12 and 13, the forming surface 30 is generally flat so as to spread the sealing material flat over the flange so that it covers a larger surface while slightly reducing its thickness.

Figure 14:
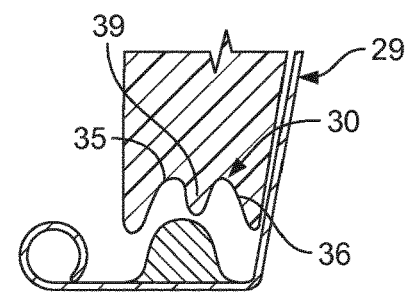
FIGS. 14 and 15 are schematic representations of the forming step with a concave punch-die.
Figure 15:
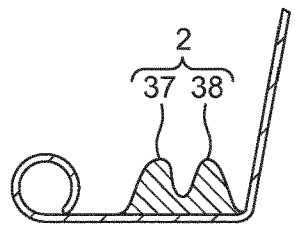

In the example of FIGS. 14 and 15, the forming surface 30 is generally concave so as to form a generally convex sealing member. The forming surface may further comprise two concave portions 35, 36 of surfaces thereby forming two circumferential ridges 37, 38 of sealing member 2. The two circumferential ridges 37, 38 may remain connected after forming (as illustrated) or, alternatively may be separated into two independent sealing portions during forming by a separating protrusion 39 of the forming surface 30.

Figure 16:
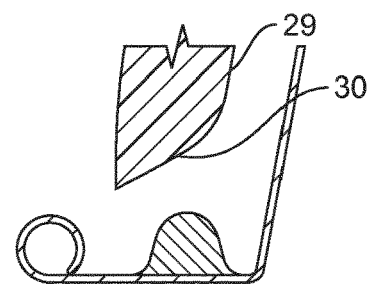
FIGS. 16 and 17 are schematic representations of the forming step with a slanted punch-die.
Figure 17:
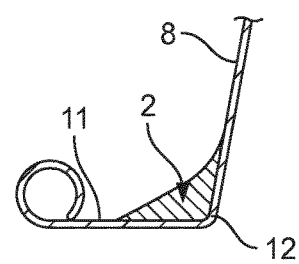

In the example of FIGS. 16 and 17, the forming surface 30 is slanted in such a manner to move a major amount of sealing material towards the side wall. The forming surface may further be flat, convex or concave depending on the needs for shaping the optimal sealing design. In the example, the slanted surface is slightly convex so as to move and deform the sealing member such that it positions itself with the larger thickness present at the transition area 12 between the flange outer surface 11 and the side wall outer surface 8.

Figures 18, 19:
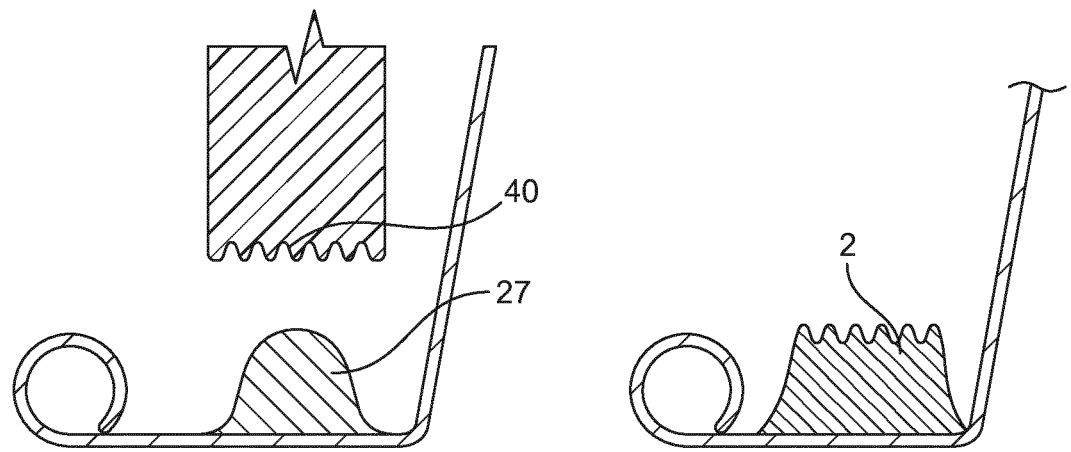
FIGS. 18 and 19 are schematic representations of the forming step with a corrugated punch-die.

In the example of FIGS. 18 and 19, the forming surface has a general shape (e.g. flat, convex or concave) and a structuring finish. This structuring finish can be, for instance, a series of small circumferential parallel grooves 40. Many other structuring surfaces are possible.

Figure 20:
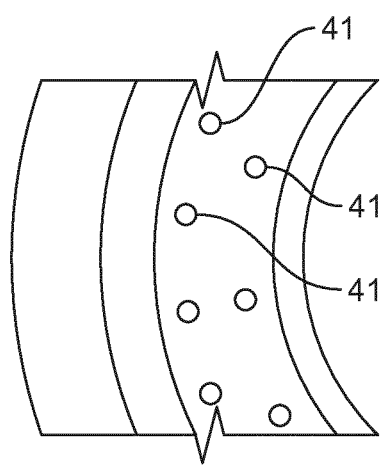
FIG. 20 is a schematic representation of the formed sealing after forming with a structuring, e.g. spiky, punch-die.

For example, in FIG. 20, the forming surface of the punch-die is configured to form a plurality of small drops 41 in relief or in recess.

The invention claimed is:

1. A method for applying a sealing member onto a cup-shaped container of a capsule intended for producing a beverage in a beverage production device, wherein the cup-shaped container has a bottom wall, a side wall with an outer surface, an open end, and an annular flange which extends from the side wall of the cup-shaped container at the open end; the annular flange comprising a flange outer surface merging with the outer surface of the side wall at a transition area and a flange inner surface opposite to the outer surface for being sealed with a beverage delivery wall, the method comprising the steps of:
    depositing molten thermoplastic polymer material by a depositing apparatus onto the outer surface of the annular flange and/or onto the transition area; and
    subsequently pressing the molten thermoplastic polymer material by a punch-die configured as an inverted cup with a central recess to accommodate on the capsule while the molten thermoplastic polymer material is plastically deformable so as to conform the molten thermoplastic polymer material onto the outer surface of the annular flange and/or onto the transition area, thereby forming the molten thermoplastic polymer material into the sealing member attached to the cup-shaped container;
    the depositing apparatus comprises a depositing subassembly comprising a nozzle, the depositing subassembly further comprising an inner part and an outer part which are coaxial and define together a flow passage communicating with the nozzle, at least one of the inner and outer parts is axially moveable relative to the other one of the inner and outer parts to open the nozzle for depositing and close the nozzle for stopping the depositing.

2. The method according to claim 1, wherein the punch-die is circumferential and comprises a continuous annular pressing surface, and wherein the pressing step comprises forming the molten thermoplastic polymer material into a final shape by pressing the circumferential punch-die comprising the continuous annular pressing surface against a mass of molten thermoplastic polymer material.

3. The method according to claim 2, wherein the depositing step comprises depositing the molten thermoplastic polymer material into a single circumferential portion of the molten thermoplastic polymer material.

4. The method according to claim 2, wherein the depositing step comprises depositing the molten thermoplastic polymer material into a circumferential arrangement of a plurality of separate portions.

5. The method according to claim 1, wherein the nozzle is selected from the group consisting of:
 a circumferential dispensing nozzle sized to a circumference of the annular flange;
 a moving nozzle displaced along the circumference of the annular flange; and
 a plurality of nozzles disposed along the circumference of the annular flange.

6. The method according to claim 1, wherein the nozzle comprises a circumferential dispensing nozzle, and wherein the depositing apparatus comprises the circumferential dispensing nozzle and the central recess arranged for accommodating at least partially the cup-shaped container of the capsule.

7. The method according to claim 1, wherein the deposited amount of molten thermoplastic polymer material is controlled at least partially by an opening time of the nozzle or by an pressure time applied to a one-way dosing valve of the nozzle.

8. The method according to claim 1, wherein the molten thermoplastic polymer material is a thermoplastic elastomer ("TPE") selected from the group consisting of:
 Styrenes;
 Copolyesters;
 Copolyamides;
 Polyurethanes;
 Polyamides;
 Polyolefin Blends;
 Polyolefin Alloys;
 Reactor TPO's;
 Polyolefin Plastomers;
 Polyolefin Elastomers; and
 combinations thereof or soft thermoplastic polymer.

9. The method according to claim 1, wherein the depositing apparatus is selected from the group consisting of a moving nozzle displaced along a circumference of the annular flange and a plurality of nozzles disposed along the circumference of the annular flange.

10. The method according to claim 9, wherein the depositing apparatus comprises the moving nozzle, and the method comprising displacing the moving nozzle along the circumference of the annular flange.

11. The method according to claim 9, wherein the depositing apparatus comprises the plurality of nozzles, and the method comprising depositing, by the plurality of nozzles, a plurality of dots or drops of molten thermoplastic polymer material spaced by a short distance.

12. The method according to claim 9, wherein the depositing apparatus comprises the plurality of nozzles, and the method comprising depositing, by the plurality of nozzles, a plurality of arc-shaped portions spaced by a short distance.

13. The method according to claim 1, wherein pressure applied by the punch-die is focused on the molten thermoplastic polymer material to be shaped into a semi-final shape of the sealing member.

14. The method according to claim 1, wherein the outer part is stationary, the method further comprising axially reciprocating the inner part relative to the outer part to open and close the nozzle.

15. The method according to claim 14, wherein the outer part includes a bore configured for receiving a central axle of the inner part.

16. The method of claim 1, wherein the depositing is stopped by the inner part returning to sealed contact with the outer part.

17. The method according to claim 1, wherein the inner part and/or the outer part includes a heating means.

18. The method of claim 17, wherein the heating means is selected from the group consisting of at least one electrical resistance or at least one heated fluid conduit.

* * * * *